United States Patent
Walker et al.

(10) Patent No.: US 9,366,773 B2
(45) Date of Patent: Jun. 14, 2016

(54) ENHANCED VISUALISATION OF GEOLOGIC FEATURES IN 3D SEISMIC SURVEY DATA

(71) Applicant: Foster Findlay Associates Limited, Newcastle Upon Tyne, Tyne and Wear (GB)

(72) Inventors: Christopher Walker, York (GB); James Lowell, Burnhope (GB); Adam John Eckersley, Whitley Bay (GB); Barbara Froner, Durham (GB)

(73) Assignee: Foster Findlay Associates Limited (GB)

( * ) Notice: Subject to any disclaimer, the term of this patent is extended or adjusted under 35 U.S.C. 154(b) by 0 days.

(21) Appl. No.: 14/770,152

(22) PCT Filed: Jan. 16, 2014

(86) PCT No.: PCT/GB2014/050125
§ 371 (c)(1),
(2) Date: Aug. 25, 2015

(87) PCT Pub. No.: WO2014/132023
PCT Pub. Date: Sep. 4, 2014

(65) Prior Publication Data
US 2016/0003956 A1 Jan. 7, 2016

(30) Foreign Application Priority Data

Feb. 26, 2013 (GB) .................................... 1303388.1

(51) Int. Cl.
*G06F 19/00* (2011.01)
*G01V 1/34* (2006.01)

(52) U.S. Cl.
CPC *G01V 1/34* (2013.01); *G01V 1/345* (2013.01); *G01V 2210/324* (2013.01); *G01V 2210/46* (2013.01); *G01V 2210/63* (2013.01); *G01V 2210/64* (2013.01); *G01V 2210/74* (2013.01)

(58) Field of Classification Search
CPC ............ G01V 1/30; G01V 1/306; G01V 1/32
USPC ................. 702/13, 14, 16, 182–185
See application file for complete search history.

(56) References Cited

U.S. PATENT DOCUMENTS

| | | | |
|---|---|---|---|
| 2010/0254219 A1 | 10/2010 | Kumaran | |
| 2012/0004849 A1 | 1/2012 | Aarre | |
| 2013/0064040 A1* | 3/2013 | Imhof | G01V 1/30 367/73 |

FOREIGN PATENT DOCUMENTS

| | | |
|---|---|---|
| GB | 2346976 | 8/2000 |
| WO | WO2009/082545 | 7/2009 |
| WO | WO2011/053141 | 5/2011 |

OTHER PUBLICATIONS

International Search Report from International Application No. PCT/GB2014/050125, mailed Sep. 5, 2014 (4 pages).

(Continued)

*Primary Examiner* — Edward Raymond
(74) *Attorney, Agent, or Firm* — Workman Nydegger (57) ABSTRACT

A method of visually enhancing at least one geologic feature in 3D seismic survey data, comprising the steps of: (a) generating at least one attribute volume definable in Cartesian space and comprising at least one attribute derivable from said 3D seismic survey data; (b) generating a first Radon data volume from data resulting from a transaxial Radon Transform of said at least one attribute volume with respect to a first Cartesian axis; (c) generating a second Radon data volume from data resulting from a transaxial Radon Transform of said first Radon data volume with respect to a second Cartesian axis; (d) generating a third Radon data volume from data resulting from exponentiating a characteristic parameter of each one of a plurality of voxels forming said second Radon data volume to a predetermined first power value, and (e) applying a first Inverse Radon Transform to said third Radon data volume with respect to said second Cartesian axis, and a subsequent second Inverse Radon Transform to the resulting data from said first Inverse Radon Transform with respect to said first Cartesian axis.

26 Claims, 10 Drawing Sheets

(56) References Cited

OTHER PUBLICATIONS

International Preliminary Report on Patentability from International Application No. PCT/GB2014/050125, mailed Jun. 5, 2015 (27 pages).

Pierre Jacquenim et al: "Automatic faults extraction using double hough transforms," SEG Technical Program Expanded Abstracts 2005, Nov. 11, 2005, pp. 755-759, XP055128869, DOI: 10.1190/1.2144436.

Nasher M. Albinhassan et al.: "Fault detection using Hough transforms," SEG Technical Program Expanded Abstracts 2003, Oct. 31, 2003, pp. 1719-1721, XP055128981, DOI: 10.1190/1.1817639.

Trong Hellem Boe: "Enhancement of large faults with a windowed 3D Radon transform filter," SEG Technical Program Expanded Abstracts 2012, Oct. 25, 2012, pp. 1-5, XP055129016, DOI: 10.1190/segam2012-1008.1.

* cited by examiner

ENHANCED VISUALISATION OF GEOLOGIC FEATURES IN 3D SEISMIC SURVEY DATA

CROSS-REFERENCE TO RELATED APPLICATIONS

This application claims priority to and the benefit of PCT Application No. PCT/GB2014/050125, filed Jan. 16, 2014, entitled "ENHANCED VISUALISATION OF GEOLOGIC FEATURES IN 3D SEISMIC SURVEY DATA", which claims the benefit of and priority to Great Britain Patent Application No. 1303388.1, filed Feb. 26, 2013, each of which is incorporated herein in its entirety.

The present invention relates generally to the field of oil and gas exploration, and in particular to the field of computer aided exploration for hydrocarbons using geophysical data, such as for example seismic data, of the earth. In particular, the present invention relates to the visual enhancement of geologic features, such as faults, in a seismic volume generated from at least one attribute.

INTRODUCTION

In the oil and gas industry, geological data surveys such as, for example, seismic prospecting and other similar techniques are commonly used to aid in the search for and evaluation of subterranean hydrocarbon deposits. As an example, prospecting operations include three basic stages (i) data acquisition, (ii) data processing and (iii) data interpretation. The success of the prospecting operation generally depends on satisfactory completion of (i), (ii) and (iii). For example, a seismic source is used to generate an acoustic signal that propagates into the earth and that is at least partially reflected by subsurface seismic reflectors. The reflected signals are then detected and recorded by an array of seismic receivers located at or near the surface of the earth, in an overlying body of water, or at known depths of boreholes.

Figure 1:
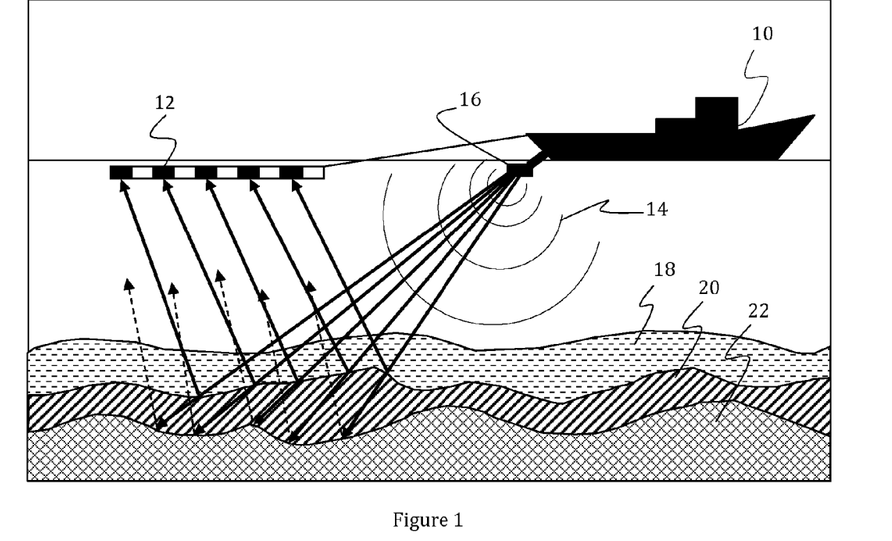
FIG. 1 shows a typical setup for an offshore seismic survey using an array of acoustic receivers (i.e. hydrophones) and sound waves generated by an air gun.

FIG. 1, for example, shows a typical setup for offshore seismic surveys, where a large seismic survey vessel 10 is used to tow acoustic receivers 12, also known as streamers, suspended below the surface, which carry hydrophones (not shown). During data acquisition, sound waves 14 are transmitted from the vessel 10 using compressed air guns 16 and which travel down through the seabed and reflect back from the different layers (strata) of rock 18, 20, 22. The reflected sound waves 14 are then received by the hydrophones (not shown) located along the seismic streamers which, when processed, can be used to provide a visual representation (2D, 3D) of the substrata.

Figure 2:
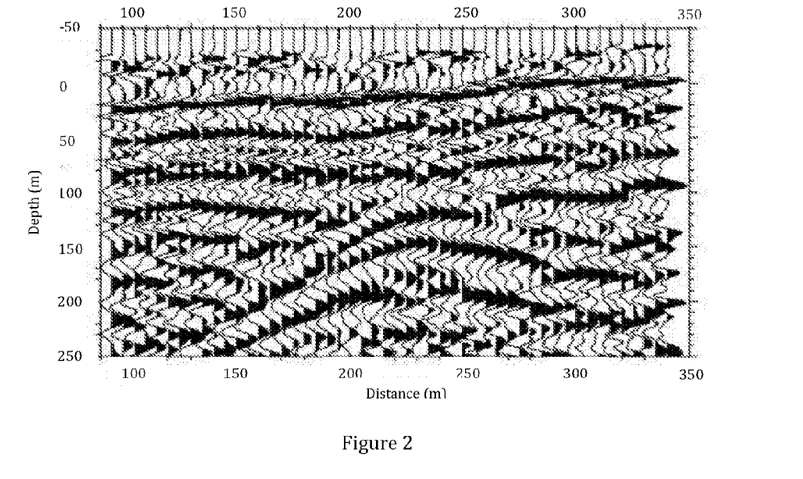
FIG. 2 shows a typical plot of migrated reflection traces recorded by the acoustic receivers after activating the air gun.

Typical seismic traces of the reflections (amplitudes) are shown in FIG. 2. The data shown in FIG. 2 has been migrated, i.e. the amplitudes of the traces are moved to their true subsurface position (depth) to eliminate any offset between the source and receiver.

Figure 3:
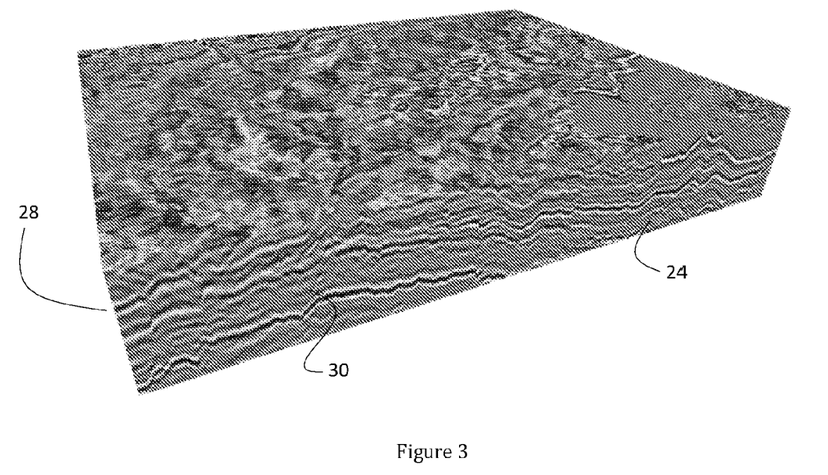
FIG. 3 shows a 3D volume of the migrated reflection data recorded by the acoustic receivers.
Figure 4:
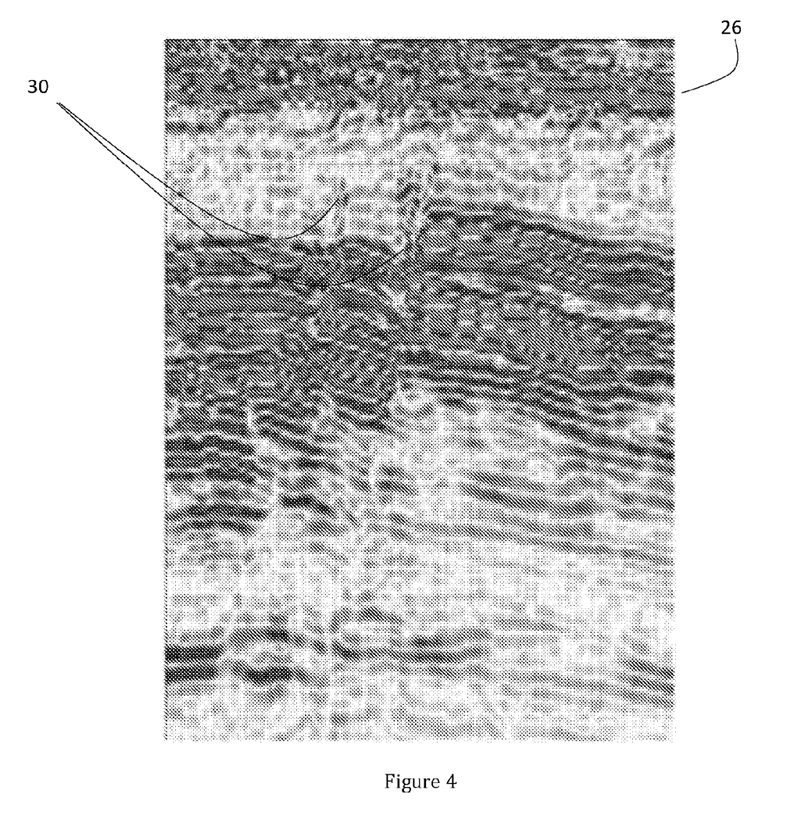
FIG. 4 shows a 2D slice of the 3D seismic volume shown in FIG. 3 clearly showing discontinuities in the horizon layers caused by faults.

FIGS. 3 and 4 show an example of a 3D seismic data volume 24 and a respective 2D slice 26 of the 3D seismic volume 24 based on the migrated reflectivity data. The representation clearly shows different horizons 28 (i.e. the surface separating two strata having different acoustic properties) and allows the identification of faults 30. In the field of geology, faults 30 are surfaces within the earth's crust at which sedimentary layers (strata, horizons) and other geological features are disrupted. In particular, faults 30 can form effective barriers to subsurface hydrocarbon flow, causing oil and gas to accumulate at faults 30.

Accordingly, the precise detection, characterization and visualization of faults 30 can be an important tool in the search for oil and gas reserves, and the accuracy and completeness with which such faults 30 can be detected, characterized and visualized may have a significant impact on identifying and exploiting those reserves.

Therefore, in order to make subtle features in the reflectivity data more discernible and therefore improve the ease of manual and/or automated detection of any geologic features, it is common practice to mathematically process the seismic reflectivity data (i.e. seismic reflection traces) in accordance with known techniques to extract specific data characteristics. These data characteristics are also known as "attributes" or "seismic attributes" and a data volume disclosing one or more of those attributes is known as an "attribute volume". Seismic attributes are understood to be any measurement derived from the seismic data and typically provide information relating to the amplitude, shape and/or position of the seismic waveform in order to reveal features, relationships and patterns within the seismic data that may not be detected otherwise. More recently, attributes are calculated using more than one input seismic trace, therefore providing quantitative information about lateral variations in the seismic data. The so-called multi-trace attributes (i.e. when comparing multiple traces) may include coherence, dip/azimuth, structural orientation, semblance or volumetric curvature. However, any one attribute that highlights faults typically does so in an incomplete way, only capturing certain characteristics of the fault expression within the seismic data, and even combining multiple attributes is not sufficient to accurately characterise and distinctively visualize geologic features such as faults in a 2D or 3D seismic survey data volume.

Figure 5:
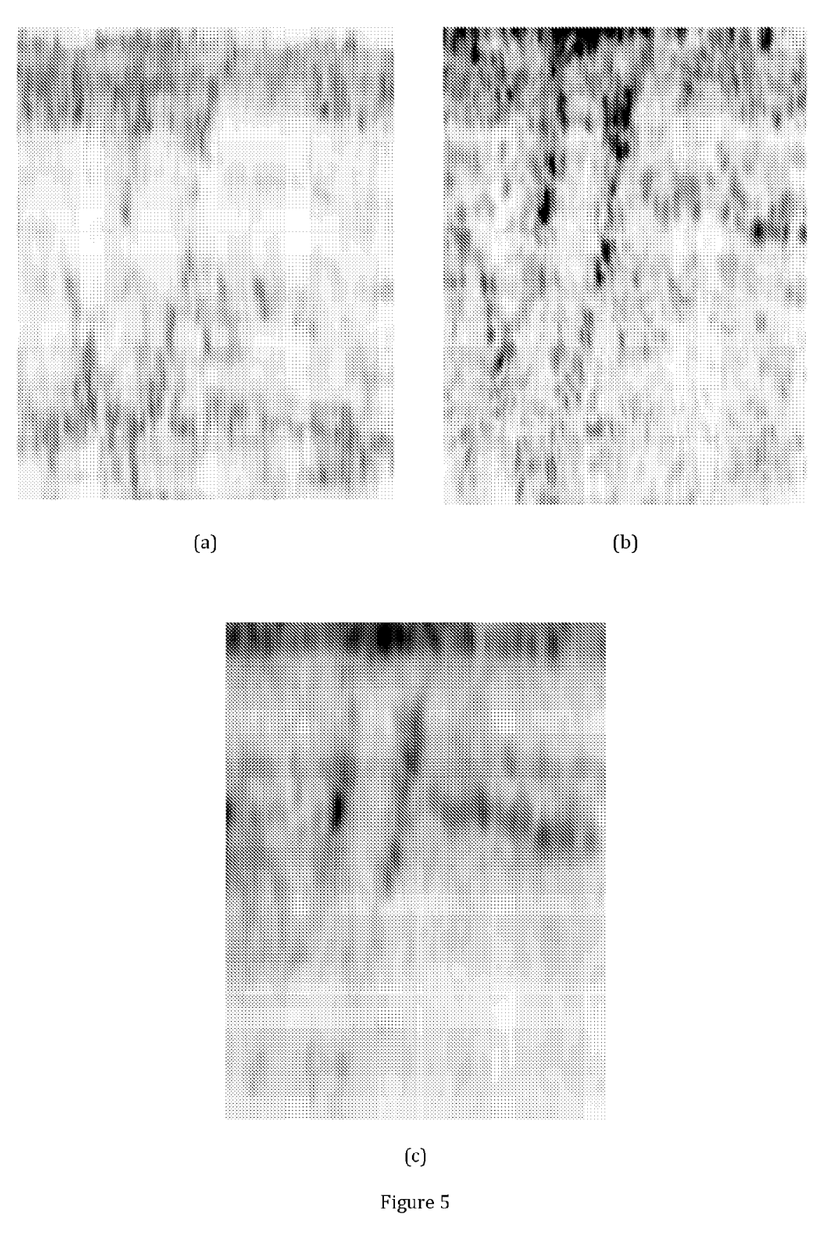
FIG. 5 shows a 2D slices of 3D attribute volumes in which the faults are highlighted using (a) a structurally orientated semblance (SOS) $1^{st}$ derivative filter, (b) a structurally orientated discontinuity (SOD) filter and a tensor filter.

FIG. 5 shows examples of 2D slices of typical attribute volumes using (a) a structurally orientated semblance (SOS) $1^{st}$ derivative filter, (b) a structurally orientated discontinuity (SOD) filter and (c) a tensor filter.

However, despite the improvements in highlighting geological features, such as faults, using attribute algorithms for several different attributes derivable from typical 3D seismic survey data, currently available software tools are still relatively unreliable when detecting and representing complex geological features. For example, one fault attribute volume may only partially detect complex faults, and therefore represent a fault containing several gaps. Also, typical attribute algorithms are often very sensitive to strata patterns, causing interferences between the visual extraction of the "wanted" geologic features (e.g. faults) and the "unwanted" geologic features (e.g. horizons).

Accordingly, it is an object of the present invention to provide a method and system that is adapted to enhance the appearance of specific geologic features and suppresses any unwanted features within a seismic survey data volume. In particular, it is an object of the present invention to visually enhance the presence of faults so as to make them more visible within a 3D seismic survey data volume.

SUMMARY OF THE INVENTION

Preferred embodiment(s) of the invention seek to overcome one or more of the above disadvantages of the prior art.

According to a first aspect of the invention there is provided a method of visually enhancing at least one geologic feature in 3D seismic survey data, comprising the steps of:
 (a) Loading 3D seismic survey data into a computer system for processing and visual representation;
 (b) generating at least one attribute volume defining a first plurality of voxels in Cartesian space and comprising at least one attribute derivable from said 3D seismic survey data;

(c) generating a first Radon data volume, defining a second plurality of voxels, from data resulting from a transaxial Radon Transform of said at least one attribute volume with respect to a first Cartesian axis;

(d) generating a second Radon data volume, defining a third plurality of voxels, from data resulting from a transaxial Radon Transform of said first Radon data volume with respect to a second Cartesian axis;

(e) generating a third Radon data volume, defining a fourth plurality of voxels, from data resulting from exponentiating a characteristic parameter of each one of said third plurality of voxels forming said second Radon data volume to a predetermined first power value, and (f) applying a first Inverse Radon Transform to said third Radon data volume with respect to said second Cartesian axis, and a subsequent second Inverse Radon Transform to the resulting data from said first Inverse Radon Transform with respect to said first Cartesian axis generating a final enhanced attribute data volume, (g) displaying said final enhanced attribute data volume on a display device of said computer system.

This provides the advantage that by performing a double Radon Transform about two different axes of a Seismic attribute volume in a Cartesian Coordinate system, the data of interest (e.g. the data showing a fault) can be compressed to a single point. Due to its "planarity" of the original set of data, enhancing the created "single points" of the data of interest in the Radon Transform domain, will enhance the appearance of the, for example, fault planes within the original Seismic attribute volume once the Radon Transform is reversed.

In particular, rotating a Seismic attribute volume during a first transaxial Radon Transform projects a fault plane within the Seismic attribute volume into Radon Transform space so that the fault plane, when orientated parallel to the direction of projection, will appear much more apparent in the presence of any noise. Rotating then the resulting 2D image during a second Radon Transform will project the 2D image of, for example, a line and reduce it to a point when orientated parallel to the direction of projection. Thus, a double Radon Transform about two different perpendicular axes of a Seismic attribute volume can compress data of interest in a plane to a single point. Emphasizing the compressed data in the Radon Transform domain by, for example, exponentiating a determining characteristic of the compressed data by a power, will enhance the appearance of the data of interest (e.g. fault planes) once reversed back into its Seismic attribute volume domain. At the same time, because the Radon Transform integrates over the projection lines through the Seismic attribute volume, intensifying the data within the planes of interests (e.g. fault planes) more than the surrounding data not within such fault planes, therefore, potentially suppressing any unwanted "noise" within the Seismic attribute volume.

Advantageously, said at least one attribute volume may include a plurality of temporary attribute volumes, each comprising at least one different attribute derivable from said 3D seismic survey data. Typically, step (c) may include generating a plurality of said first Radon data volume, each one of said plurality of first Radon data volume corresponding to each of said plurality of temporary attribute volumes, and wherein step (d) includes generating a plurality of said second Radon data volume, each one of said plurality of second Radon data volume corresponding to each of said plurality of first Radon data volumes, and wherein step (e) includes generating a plurality of said third Radon data volume, each one of said plurality of third Radon data volume corresponding to each of said plurality of second Radon data volumes, and wherein step (e) may further include combining each one of said plurality of third Radon data volume, derived from each one of said plurality of temporary attribute volumes, with each other to form a single combined Radon data volume. Preferably, each one of said third Radon data volume may be combined by multiplication. Advantageously, the contribution of each one of said plurality of temporary attribute volumes towards the combination of each one of said third Radon data volume may be selectively adjustable.

Using and combining different attribute algorithms provides the advantage of improved quality of Seismic attribute volume data therefore optimizing the effectiveness of enhancement in the Radon Transform domain.

For example, there are a number of different fault attribute algorithms and each one is sensitive to a different aspect of the fault structure. Therefore, a fault may be visually defined at one point in the Seismic attribute volume but not another, whereas, a different attribute may provide a contrary result. Mutually enhancing each one of the different attributes in the Radon Transform domain, and then combining the enhanced attribute volumes in the Radon Transform domain before reversing the Radon Transform, may improve the visual enhancement of the fault planes and reduce the effect of noise even further.

Typically, the method may further including a step (e1) that is subsequent to step (e):

(e1) exponentiating said characteristic parameter of each one of said plurality of voxels to a second power value that is dependent on the general angular orientation of said at least one geologic feature within the Cartesian space.

Preferably, said second power value applied to voxels of any one of said at least one geologic feature that is orientated horizontal, which is parallel to the general orientation of the ground surface of the earth, with respect to the Cartesian space defined by said attribute volume, has a minimum magnitude adapted to visually suppress said geologic feature within said attribute volume. Furthermore, said second power value applied to voxels of any one of said at least one geologic feature that is orientated vertical, which is perpendicular to the general orientation of the ground surface of the earth, with respect to the Cartesian space defined by said attribute volume, has a maximum magnitude adapted to visually maximally enhance said geologic feature within said attribute volume. Even more advantageously, said second power value applied to voxels of any one of said at least one geologic feature that is angularly orientated between said vertical and said horizontal with respect to the Cartesian space defined by said attribute volume, may gradually increase with increasing angular orientation gradient of said at least one geologic feature from said minimum magnitude to said maximum magnitude.

This provides the advantage that "unwanted" geologic feature, such as rock strata planes, or Horizons, that would normally be "enhanced" by the Radon Transform, can be suppressed according to the angular orientation of the geologic feature.

For example, rock strata planes tend to be approximately horizontal, whereas fault planes are usually orientated much closer to the vertical. To ensure that only fault planes are enhanced, the orientation ($\alpha$) of the plane within the Seismic attribute volume can be used to control the extent of enhancement a particular geologic feature plane will receive, i.e. planes orientated towards the horizontal are suppressed and planes orientated towards the vertical (e.g. 60° to 80° from horizontal) are enhanced, with a graduated change of the extent of enhancement (e.g. a power 'n($\alpha$)') between the two extremes (i.e. minimum at horizontal, maximum at vertical).

A method according to any one of the preceding claims, wherein step (e) may further include:

normalisation of said second Radon data volume over a corresponding transaxial path length of said second Radon Transform through said first Radon data volume, prior to exponentiating said characteristic parameter of each one of said plurality of voxels, and reverse said normalisation of said second Radon data volume subsequent to exponentiating said characteristic parameter of each one of said plurality of voxels.

This provides the advantage of eliminating the effect of different projection path lengths through the Seismic attribute volume, therefore, further improving the quality of enhancement of the data of interest.

Advantageously, step (b) may further include dividing said at least one attribute volume into a plurality of subvolumes, and wherein each one of said plurality of subvolumes is processed through subsequent steps (c) to (f) so as to generate a plurality of enhanced attribute subvolumes.

This provides the advantage that complex structures and orientations of faults within a whole Seismic attribute volume can be considered and enhanced individually, allowing an improved visualization of all of the geologic features of interest located within the Seismic attribute volume.

Preferably, each one of said plurality of subvolumes may overlap with each one of its adjacent subvolumes in a boundary region. Advantageously, said overlapping boundary region may be between 10% and 50% of the edge length of any one of said plurality of subvolumes. Even more advantageously, said overlapping boundary region may be between 40 and 50% of the edge length of any one of said plurality of subvolumes. Even more advantageously, said overlapping boundary region may be at least 50% of the edge length of any one of said plurality of subvolumes. Typically, the number of said plurality of subvolumes may be determined in accordance with a distribution pattern of said at least one geologic feature within said at least one attribute volume. Advantageously, corresponding data of said plurality of enhanced subvolumes may be combined so as to form an enhanced attribute volume. Even more advantageously, the contribution from the data of a boundary region of each one of said plurality of enhanced attribute subvolumes and its overlapping adjacent enhanced attribute subvolumes towards said enhanced attribute volume may be weighted according to a position of the data within said boundary region. Preferably, the contribution from the data within said boundary region may be weighted according to a linear distance of each one of the data within said boundary region to an intersecting face between overlapping enhanced attribute subvolumes. Even more preferably, the contribution from each one of the data within said boundary region may be inversely proportional to its linear distance from said 10 intersecting face in its corresponding enhanced attribute subvolume. Advantageously, the contribution from each one of the data within said boundary region may be between 0% and 100%, and wherein the combination of the contribution of respective overlapping data within said boundary region may add up to a total of 100%.

This provides the advantage that different visual enhancements of the same geologic feature in different subvolumes can be adjusted and "balanced out" between adjacent subvolumes, so that a geologic feature running through a plurality of subvolumes appears as a uniform feature within the Seismic attribute volume. For example, the subvolumes may be arranged so as to overlap by 50% with its neighbouring subvolume and the contribution of each subvolume to the final attribute volume may be weighted so that the total contribution of the overlapping subvolumes adds up to 100%. Therefore, the contribution of a first subvolume at the start of the overlapping region within the first subvolume will be 100%, and the contribution of the second subvolume at that point will be 0%. When gradually moving through the overlapping region towards the second subvolume will increase the contribution of the second subvolume and proportionally decrease the contribution of the first subvolume.

Preferably, the corresponding data may only be combined within a predetermined sub-region of said boundary region. Even more preferably, said predetermined sub-region may be defined by ring artefacts occurring in said enhanced attribute subvolumes.

This provides the advantage of eliminating any ring artefacts formed within each subvolume as a result of the Radon Transform. In particular, only data located within the ring artefact and within the overlapping boundary region of two adjacent subvolumes is used to qualitatively combine the data of first and second subvolume.

Typically the method may further comprise an additional step of:

(h) applying a filter adapted to minimize or remove any artefacts from said enhanced attribute volume.

Preferably, said at least one attribute may be any one of the amplitude, shape, position of a seismic waveform, or the coherence, dip/azimuth, structural orientation, semblance and volumetric curvature derivable from said 3D seismic survey data. Even more preferably, said at least one geologic feature may be a fault.

Advantageously, said characteristic parameter may be the intensity of each one of said plurality of voxels.

According to a second aspect of the invention there is provided a computer system adapted to visually enhance at least one geologic feature in 3D seismic survey data by processing said 3D seismic survey data utilising a method according to the first aspect of the present invention.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION OF THE PREFERRED EMBODIMENT(S)

The exemplary embodiments of this invention will be described in relation to interpretation of 3D seismic data. However, it should be appreciated that, in general, the system and method of this invention will work equally well for any other type of 3D data from any environment.

Figure 15:
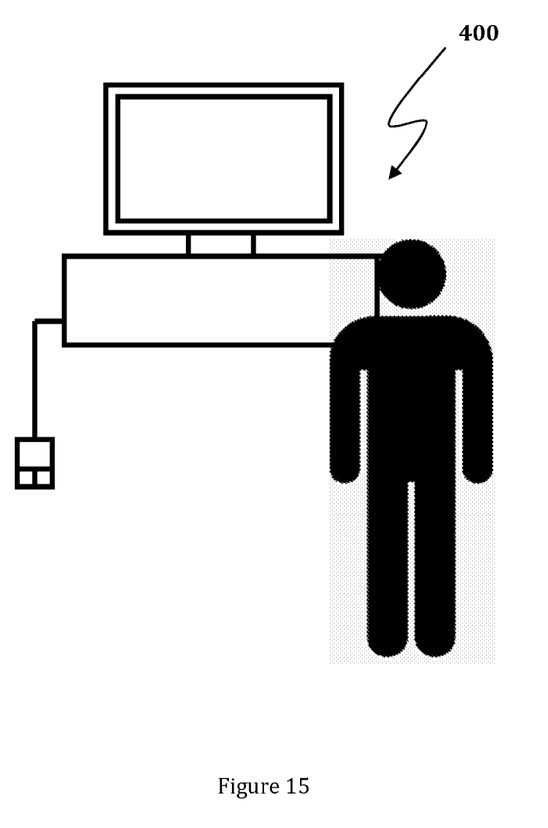
FIG. 15 shows a simplified example of a system suitable to perform the method of the present invention.

For purposes of explanation, it should be appreciated that the terms 'determine', 'calculate' and 'compute', and variations thereof, as used herein are used interchangeably and include any type of methodology, process, mathematical operation or technique, including those performed by a system 400, as depicted in a simplified form in FIG. 15. The terms 'generating' and 'adapting' are also used interchangeably describing any type of computer modelling technique for visual representation of a subterranean environment from geological survey data, such as 3D seismic data. In addition, the terms 'vertical' and 'horizontal' refer to the angular orientation with respect to the surface of the earth, i.e. a seismic data volume is orientated such that 'vertical' means substantially perpendicular to the general orientation of the ground surface of the earth (assuming the surface is substantially flat), and 'horizontal' means substantially parallel to the general orientation of the ground surface of the earth. In other words, a seismic data volume is therefore in alignment with respect to the surface of the earth so that the top of the seismic volume is towards the surface of the earth and the bottom of the seismic volume is towards the centre of the earth. Furthermore, the term 'voxel' is generally known by the person skilled in the art and refers to a volumetric pixel or volumetric picture element, representing a value on a regular grid in 3D space.

Figure 6:
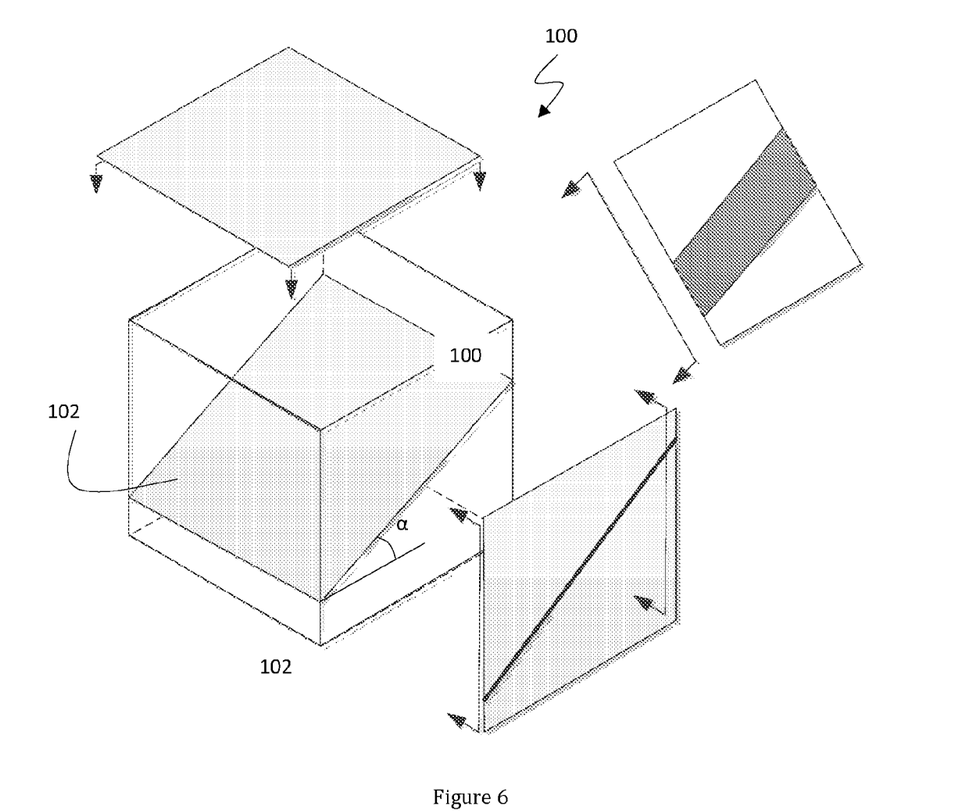
FIG. 6 shows a simplified illustration of an attribute volume containing a fault and its projections of the Radon Transform (RT) from three different directions.
Figure 7:
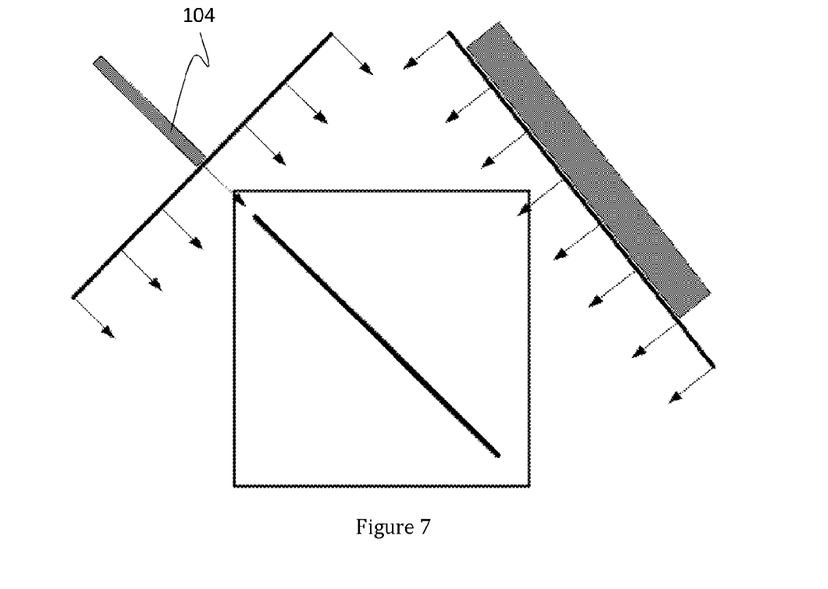
FIG. 7 shows a simplified illustration of a 2D projection from a Radon Transform in a direction that is parallel with the angular orientation of the fault plane, and in a direction perpendicular to the angular orientation of the fault plane within the seismic volume.
Figure 8:
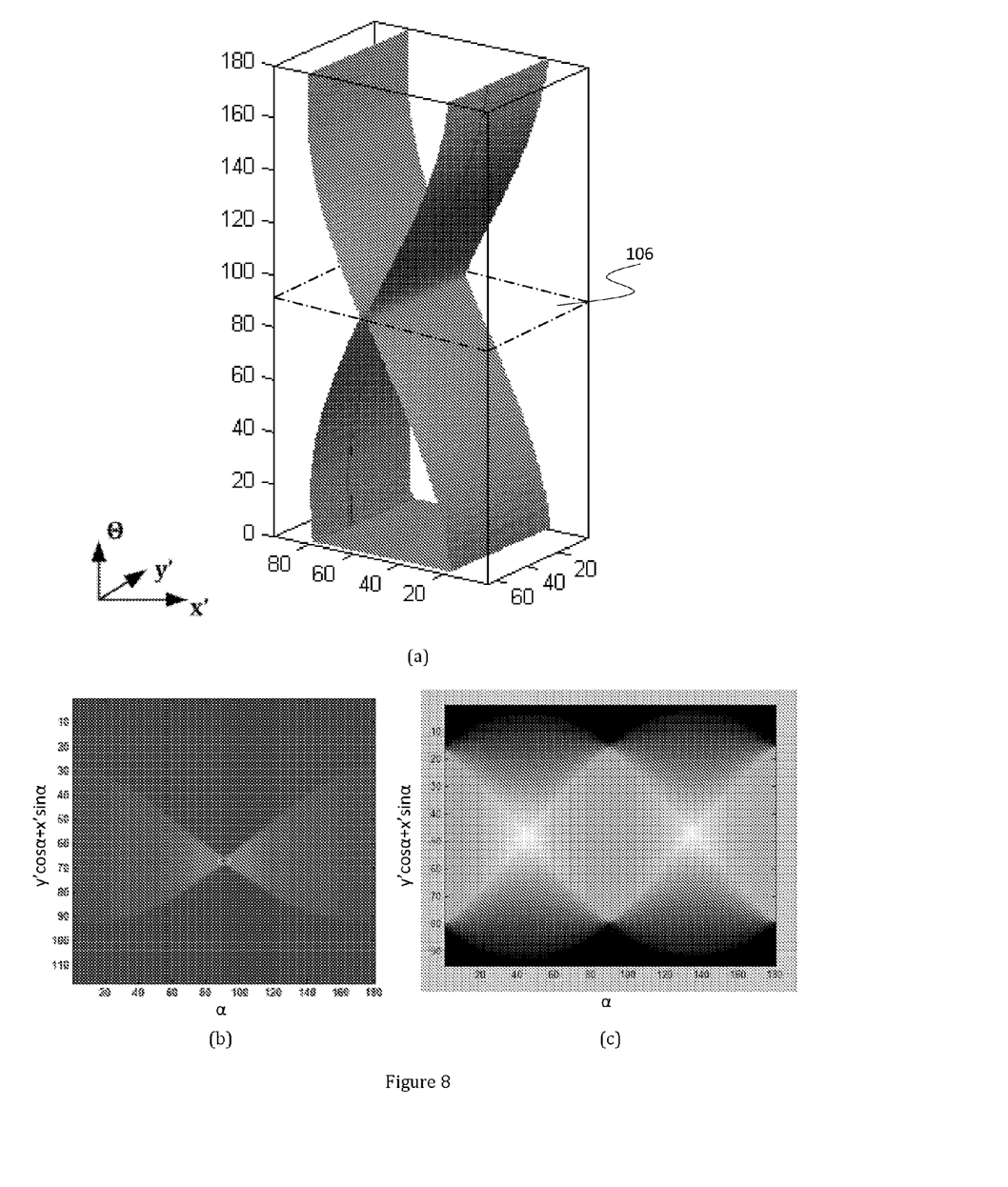
FIG. 8 (a) shows the Radon transform data ($\Theta=0°-180°$) after a first Radon Transform of the 2D fault illustrated in FIG. 6, and the Radon Transform data after a second Radon Transform (b) around a central slice (Θ=90°) and (c) around the topmost slice (Θ=180°), α is the angle of orientation.

Referring now to FIGS. 6, 7 and 8, the operation of a Radon Transform algorithm on Seismic attribute data is described on a simple example volume 100 having a geologic feature in form of a plane 102 that is orientated at an angle α with respect to the horizontal face of the example volume 100.

As commonly known, a Radon Transform (RT) computes projections of an object by integrating over the path length through the object. The Radon Transform (RT) and its inverse transform (IRT) are widely used in tomography and other image processing in 2D and 3D and are therefore not described in any great detail.

In particular, in 2D Euclidean space, the RT is a function $f(x,y)$, which is defined as:

$$P_\Theta(\rho) = \int_{-\infty}^{\infty}\int_{-\infty}^{\infty} f(x,y)\delta(\rho - x\cos\Theta - y\sin\Theta)dx\,dy \quad \text{(Eq. 1)}$$

Where δ(r) is the Dirac delta function which is zero except when r=0. The presence of the term δ(ρ−x cos Θ−y sin Θ) in Eq. 1 forces the integration of $f(x,y)$ along the line ρ−x cos Θ−y sin Θ=0.

Consequently, if $f(x,y)$ is a 2D image intensity function, computation of the RT yields a projection across the image at varying orientation Θ and offset ρ (relative to a parallel line passing through the image centre).

FIG. 6 shows a simplified example of projections (sinogram) at three different angles with regards to the geologic feature plane 102 within the Seismic data volume. A projection in a direction parallel to the orientation of the geologic feature plane 102 appears as a high intensity line and any projection in a direction deviating from that will spread more or less across the projected sinogram.

FIG. 7 shows a second RT of the "line" generated with the RT shown in FIG. 6, whereas the projection in a direction that is parallel to the orientation of the line generates a narrow, high amplitude output 104 compared to projections in any direction that is not parallel to the orientation of the line.

To "capture" an object fully, the projection orientation Θ may vary between 0° and 180°. For example, FIG. 8(a) shows a first RT of the plane 102 in FIG. 6, wherein the vertical axis is the angle of orientation Θ.

FIG. 8(b) shows the data after a second RT rotating in a plane 106 and around the portion representing the projection in a direction parallel to the geologic feature plane 102 (i.e. the centre slice of FIG. 8(a)) at Θ=90°. The horizontal axis in FIG. 8(b) is the angle of rotation for the second RT. It can be seen that at an orientation of 90°, all the points in the plane 106 are integrated into a single point, creating a high intensity region.

FIG. 8(c) shows the data after a second RT rotating in a plane parallel to the plane 106 and around the portion representing the projection in a direction perpendicular to the geologic feature plane 102 (i.e. the topmost slice of FIG. 8(a)) at Θ=180°.

Figure 9:
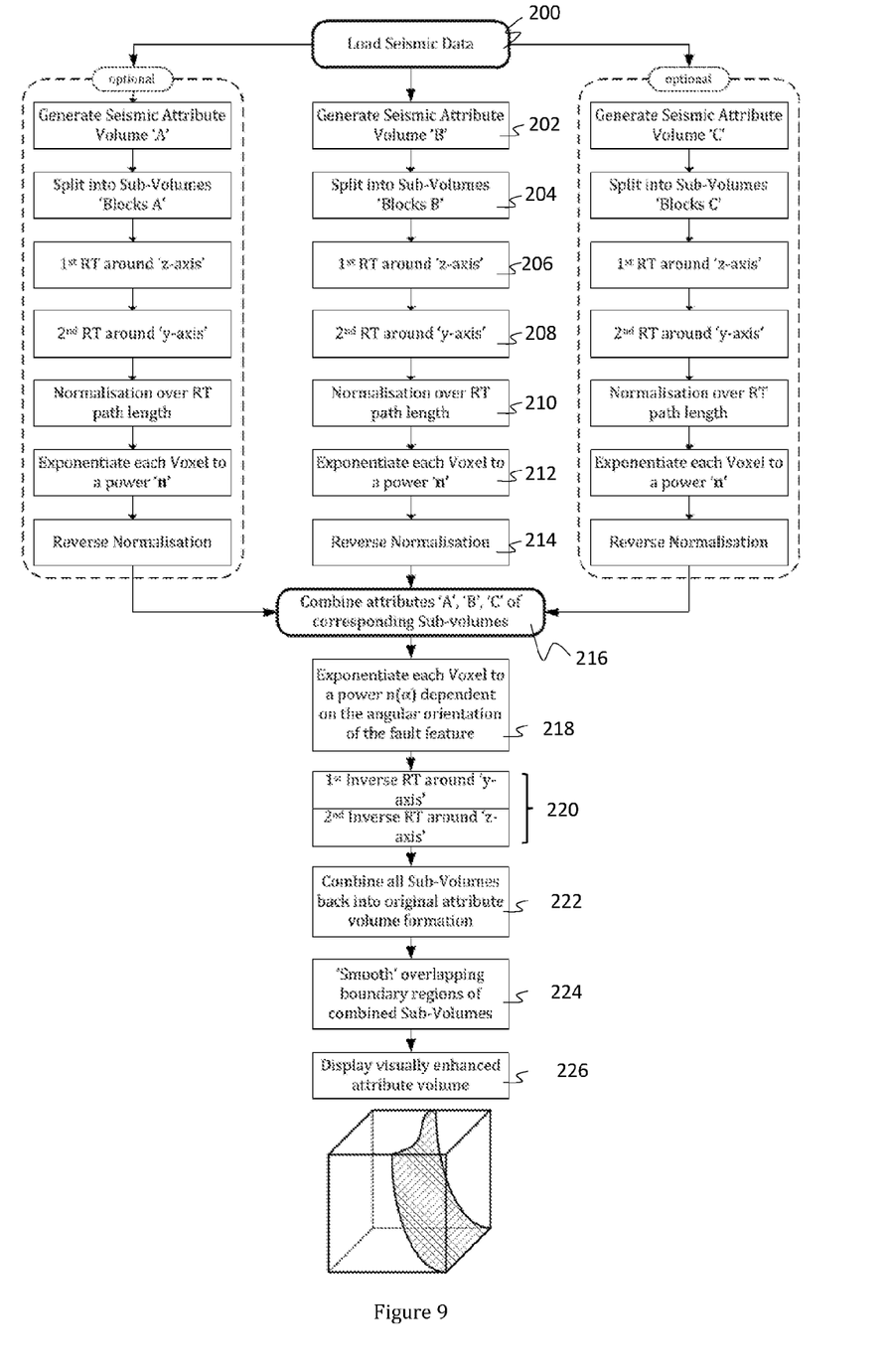
FIG. 9 shows a flow diagram of a preferred method of the present invention.

Referring now to FIG. 9, a flow diagram of a preferred method of the present invention is shown.

In this exemplary embodiment, 3D Seismic data is first loaded 200 into a computer system for processing. A plurality of attribute volumes is then generated 202 for different attributes 'A', 'B', 'C' of the Seismic survey data volume. For example, attribute volumes may be calculated for any one of the amplitude, shape, position of a seismic waveform, or the coherence, dip/azimuth, structural orientation, semblance and volumetric curvature derivable from said 3D seismic survey data. Each one of the different attribute volumes is then divided 204 into subvolumes such as the representative subvolumes 302, 303, 304, 305.

For example, the Seismic attribute volume may be divided into 32×32×32 subvolumes, but any other number of subvolumes suitable for a specific pattern of geologic features may be used.

Figure 10:
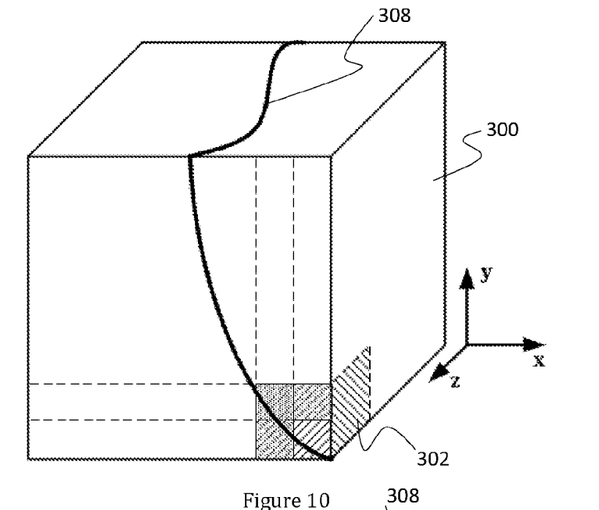
FIG. 10 illustrates a seismic attribute volume from any one of the attributes shown in FIG. 5 including a typical fault.
Figure 11:
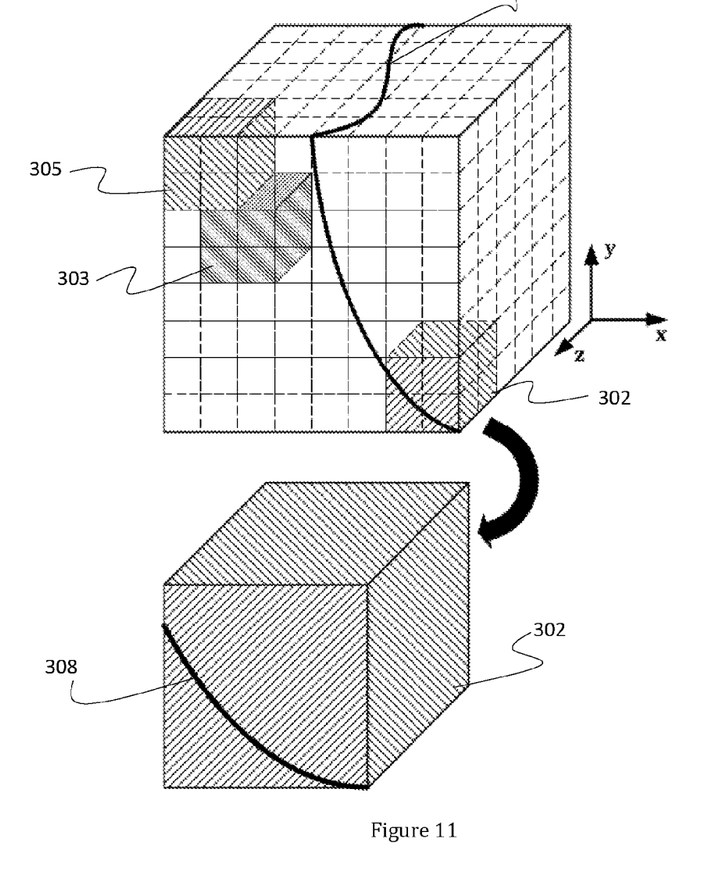
FIG. 11 (a) illustrates the seismic attribute volume of FIG. 10 divided into overlapping subvolumes, three representative subvolumes are highlighted, and (b) an exploded view of a single subvolume.
Figure 12:
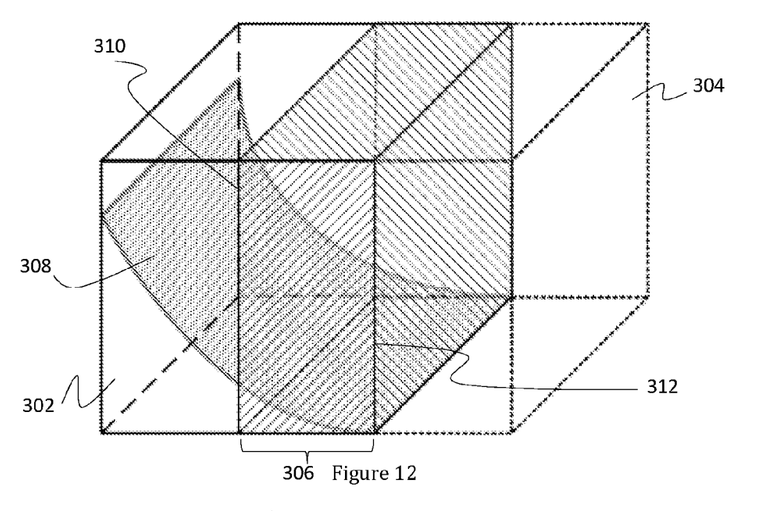
FIG. 12 shows an illustration of two overlapping subvolumes (50% overlap) forming a boundary region (shaded)

FIG. 10, shows an example of a Seismic attribute volume 300 and a subvolume 302 in a Cartesian space defined by x, y, z axis. FIG. 11 shows a schematic view of the layout of the subvolumes 302 in the Seismic attribute volume 300. In this particular example, subvolume 302 overlaps with its adjacent subvolume 304 by 50% so as to create a boundary region 306, as illustrated in FIG. 12 (shaded region). For clarity, FIG. 11 only shows three individual subvolumes 302, 303, 305 and the outline of all overlapping subvolumes within the Seismic attribute volume 300, as well as a fault plane 308 running through a limited number of subvolumes.

Referring back to the flow diagram in FIG. 9, each subvolume of each attribute (e.g. 'A', 'B', 'C') is then processed individually by computing a first RT 206 around a first axis of the Seismic attribute volume (e.g. 'z' axis of the Cartesian coordinate system describing the Seismic attribute volume), and a second RT 208 of the first RT around a second axis of the Seismic attribute volume (e.g. 'y' axis of the Cartesian coordinate system describing the Seismic attribute volume).

The data of the second RT is then normalised 210 over the path length of the projection through the Seismic attribute volume to adjust for any "error" during the subsequent enhancement step in 212. For example, each voxel of the second RT data may be normalised over the number of voxels the line of projection passes through the Seismic attribute volume during the first RT. In other words, normalising the data takes into account the differing path lengths for different parts of the Radon data volume, therefore, avoiding or minimizing varying extents of enhancements the data.

After normalisation, each voxel is enhanced by exponentiating its normalised intensity to a predetermined power 212. For example, the intensity of each voxel may be raised to the power of '2', before the normalisation is reversed back in step 214. However, it is understood by the person skilled in the art, that any other characteristic parameter of the voxel may be enhanced, by raising this parameter to a predetermined power.

Once all subvolumes of all different attribute volumes are processed through steps 206 to 214, each subvolume from one attribute data volume (e.g. attribute volume 'A') is combined 216 with its corresponding subvolumes of the other attribute data volume (e.g. attribute volumes 'B' and 'C') creating combined subvolumes including the features of all different attributes (e.g. 'A', 'B', 'C'). The different attribute subvolumes may be combined by multiplication.

In step 218, each voxel of each of the combined subvolumes is then enhanced by exponentiating its intensity to a power that is dependent on the angular orientation of the geologic feature of interest (e.g. fault) within the Seismic attribute volume. This will ensure that any "unwanted" geologic features, such as rock strata (Horizons) are suppressed during the enhancement of the "wanted" geologic features, i.e. faults. Therefore, the angular orientation of the geologic feature plane is used to control how much enhancement a particular plane will receive. For example, planes that are orientated close to horizontal are suppressed by using a power value that suppresses the plane, wherein planes that are orientated substantially vertical (e.g. within 60° to 80° from the horizontal orientation), are enhanced by a predetermined power value that gradually decreases with decreasing orientation towards the horizontal orientation.

In step 220 of FIG. 9, the enhanced data of each subvolume is then processed through inverse Radon Transforms (IRT) around respective second axis and first axis of the Cartesian coordinate system (i.e. y-axis, z-axis), and all subvolumes are combined back 222 into the original attribute data volume layout as shown in FIG. 11. The subvolumes may be combined back into the original attribute data volume layout by any suitable means.

Figure 13:
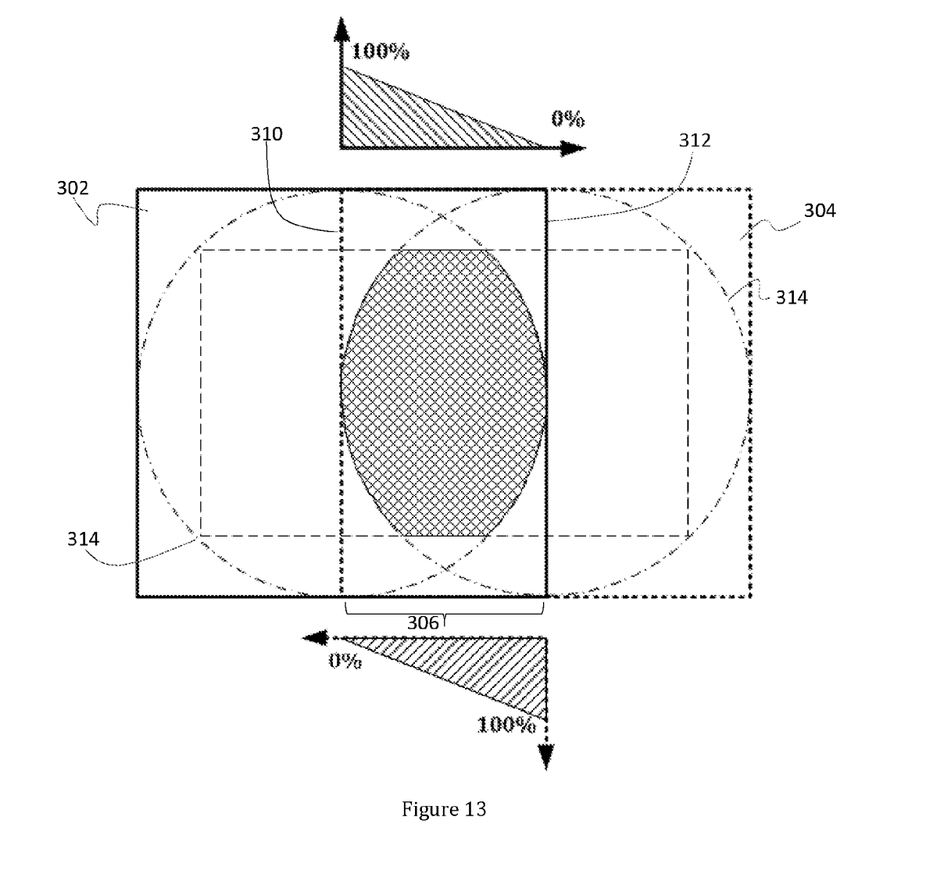
FIG. 13 shows a simplified 2D illustration of the overlapping subvolumes of FIG. 12, including ring artefacts (chain dotted line) and data selected from each subvolume (dashed line) that is combined via "smoothing" (shaded area), including the contribution proportion (%) of the combined data from each subvolume.

In order to prevent any detrimental effects to the appearance the visually enhanced final attribute data volume from processing the subvolumes individually, and therefore causing different enhancement effects for each subvolume, the overlapping boundary regions 306 of adjacent subvolumes (e.g. 302, 304) are combined 224 so as to "smooth" the data of one subvolume (e.g. 302) into an adjacent subvolume (e.g. 304) (see FIGS. 12 and 13). In the example shown in FIG. 12, the start 310 of the boundary region 306 for subvolume 302 is at the centre plane of subvolume 302, wherein the start 312 of the boundary region 306 for subvolume 304 is at the centre plane of subvolume 304. The contribution of each subvolume 302, 304 towards the final attribute data volume is weighted according to the linear distance of the corresponding data from the respective start 310, 312 of the boundary region 306. For example, at the start 310 of boundary region 306, the contribution of subvolume 302 is 100% and the contribution of subvolume 304 is 0%. At the midpoint between start 310 and start 312 of boundary region 306, the contribution of both subvolumes 302 and 304 is 50%, wherein at start 312, the contribution of subvolume 302 is 0% and the contribution of subvolume 304 is 100%. The linear function of the contribution for respective overlapping subvolumes is illustrated in FIG. 13. It is understood by the person skilled in the art that any other suitable linear or non-linear function may be used to portion the contribution of overlapping subvolumes within a boundary region 306.

In addition, one of the possible side effects of the RT enhancement is a "ring artefact" that appears as a circle 314 having a diameter identical to the edge length of a subvolume. Therefore, only data within the circle and within the overlapping boundary region 306 is used to generate "smoothing" of the final attribute data volume. The combined and "smoothed" data within the overlapping boundary region 306 and the overlapping circles 314 of the "ring artefacts" is shown in FIG. 13 (shaded).

Figure 14:
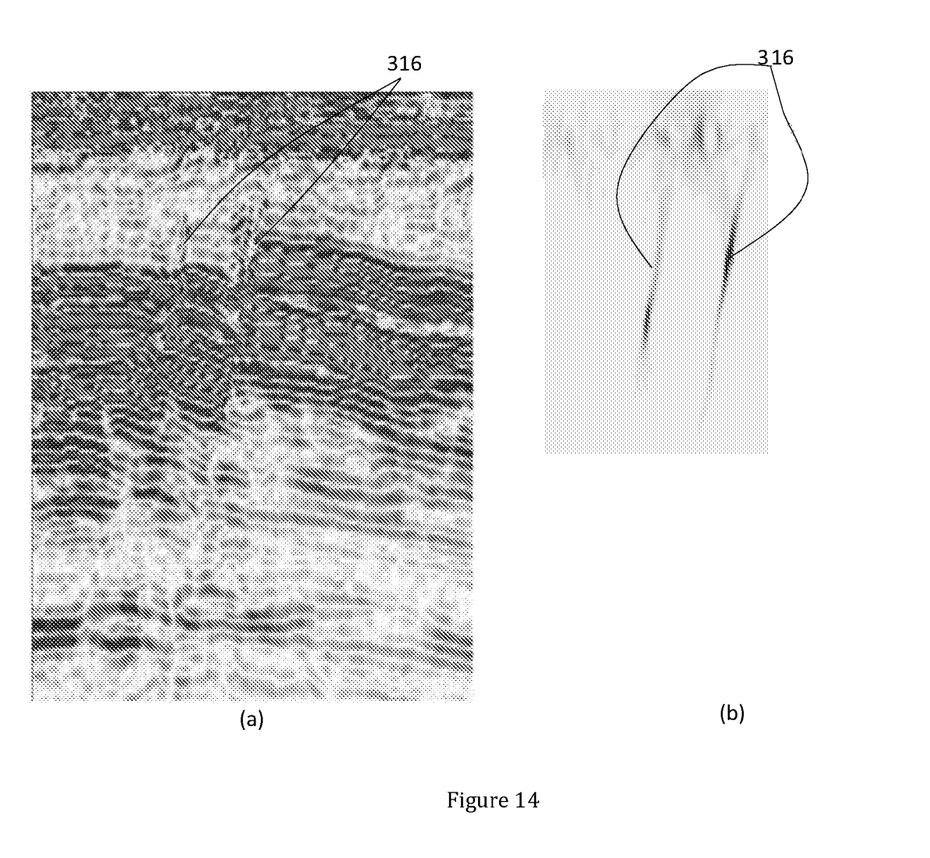
FIG. 14 shows a 2D slice of an attribute volume (including two faults) before "visual enhancement" and after "visual enhancement"

After combining all subvolumes into a final attribute data volume, the visually enhanced attribute volume may be displayed for inspection 226 on a display (not shown). An example of attribute data (2D slice) (a) before and (b) after visual enhancement is shown in FIG. 14. The faults 316 are difficult to detect in FIG. 14(a), but are clearly visible in FIG. 14(b), where all "unwanted" noise and geologic features are suppressed by the preferred method of the invention.

FIG. 15 shows a simplified illustration of a typical workstation 400 including a computer and monitor operable by a user.

It is understood by the person skilled in the art, that the present invention may only require steps 200, 202, 206, 208, 212, 220, and 226 to provide at least some advantages over the existing prior art.

Alternatively, it is understood that, in 2D space, the RT may be carried out by integrating along projection lines in any direction to form the sinogram. Hence, when processing data in 3D, the RT may be represented in spherical coordinates (ρ, Θ, φ), where ρ is the radial coordinate along a direction specified by the angles Θ and φ. A discrete version of the RT may be obtained by sampling the RT at values equidistant along ρ, Θ, φ. Thus, the integration in 3D occurs within planes rather than along lines (as described in the preferred embodiment).

It will be appreciated by persons skilled in the art that the above embodiment has been described by way of example only and not in any limitative sense, and that various alterations and modifications are possible without departing from the scope of the invention as defined by the appended claims.

The invention claimed is:

1. A method of visually enhancing at least one geologic feature in 3D seismic survey data, comprising the steps of:
   (a) loading 3D seismic survey data into a computer system for processing and visual representation;
   (b) generating at least one attribute volume defining a first plurality of voxels in Cartesian space and comprising at least one attribute derivable from said 3D seismic survey data;
   (c) generating a first Radon data volume, defining a second plurality of voxels, from data resulting from a transaxial Radon Transform of said at least one attribute volume with respect to a first Cartesian axis;
   characterised in that the method further comprises the steps of:
   (d) generating a second Radon data volume, defining a third plurality of voxels, from data resulting from a transaxial Radon Transform of said first Radon data volume with respect to a second Cartesian axis;
   (e) generating a third Radon data volume, defining a fourth plurality of voxels, from data resulting from exponentiating a characteristic parameter of each one of said third plurality of voxels forming said second Radon data volume to a predetermined first power value,
   (f) applying a first Inverse Radon Transform to said third Radon data volume with respect to said second Cartesian axis, and a subsequent second Inverse Radon Transform to the resulting data from said first Inverse Radon Transform with respect to said first Cartesian axis generating a final enhanced attribute data volume; and
   (g) displaying said final enhanced attribute data volume on a display device of said computer system.

2. A method according to claim 1, wherein said at least one attribute volume includes a plurality of temporary attribute volumes, each comprising at least one different attribute derivable from said 3D seismic survey data.

3. A method according to claim 2, wherein step (c) includes generating a plurality of said first Radon data volume, each one of said plurality of first Radon data volume corresponding to each of said plurality of temporary attribute volumes, and wherein step (d) includes generating a plurality of said second Radon data volume, each one of said plurality of second Radon data volume corresponding to each of said plurality of first Radon data volumes, and wherein step (e) includes generating a plurality of said third Radon data volume, each one of said plurality of third Radon data volume corresponding to each of said plurality of second Radon data volumes, and wherein step (e) further includes combining each one of said plurality of third Radon data volume, derived from each one of said plurality of temporary attribute volumes, with each other to form a single combined third Radon data volume.

4. A method according to claim 3, wherein each one of said third Radon data volume are combined by multiplication.

5. A method according to claim 3, wherein the contribution of each one of said plurality of temporary attribute volumes towards the combination of each one of said third Radon data volume is selectively adjustable.

6. A method according to claim 1, further including a step (e1) that is subsequent to step (e):
   (e1) exponentiating said characteristic parameter of each one of said plurality of voxels to a second power value that is dependent on the general angular orientation of said at least one geologic feature within the Cartesian space.

7. A method according to claim 6, wherein said second power value applied to voxels of any one of said at least one geologic feature that is orientated horizontal, which is parallel to the general orientation of the ground surface of the earth, with respect to the Cartesian space defined by said attribute volume, has a minimum magnitude adapted to visually suppress said geologic feature within said attribute volume.

8. A method according to claim 6, wherein said second power value applied to voxels of any one of said at least one geologic feature that is orientated vertical, which is perpendicular to the general orientation of the ground surface of the earth, with respect to the Cartesian space defined by said attribute volume, has a maximum magnitude adapted to visually maximally enhance said geologic feature within said attribute volume.

9. A method according to claim 7, wherein said second power value applied to voxels of any one of said at least one geologic feature that is angularly orientated between said vertical and said horizontal with respect to the Cartesian space defined by said attribute volume, gradually increases with increasing angular orientation gradient of said at least one geologic feature from said minimum magnitude to said maximum magnitude.

10. A method according to claim 1, wherein step (e) further includes:
    normalisation of said second Radon data volume over a corresponding transaxial path length of said second Radon Transform through said first Radon data volume, prior to exponentiating said characteristic parameter of each one of said plurality of voxels, and
    reverse said normalisation of said second Radon data volume subsequent to exponentiating said characteristic parameter of each one of said plurality of voxels.

11. A method according to claim 1, wherein step (b) further includes dividing said at least one attribute volume into a plurality of subvolumes, and wherein each one of said plurality of subvolumes is processed through subsequent steps (c) to (f) so as to generate a plurality of enhanced attribute subvolumes.

12. A method according to claim 11, wherein each one of said plurality of subvolumes overlaps with each one of its adjacent subvolumes in a boundary region.

13. A method according to claim 12, wherein said overlapping boundary region is between 10% and 50% of the edge length of any one of said plurality of subvolumes.

14. A method according to claim 12, wherein the number of said plurality of subvolumes is determined in accordance with a distribution pattern of said at least one geologic feature within said at least one attribute volume.

15. A method according to claim 12, wherein corresponding data of said plurality of enhanced attribute subvolumes is combined so as to form an enhanced attribute volume.

16. A method according to claim 15, wherein the contribution from the data of a boundary region of each one of said plurality of enhanced attribute subvolumes and its overlapping adjacent enhanced attribute subvolumes towards said enhanced attribute volume is weighted according to a position of the data within said boundary region.

17. A method according to claim 16, wherein the contribution from the data within said boundary region is weighted according to a linear distance of each one of the data within said boundary region to an intersecting face between overlapping enhanced attribute subvolumes.

18. A method according to claim 17, wherein the contribution from each one of the data within said boundary region is inversely proportional to its linear distance from said intersecting face in its corresponding enhanced attribute subvolume.

19. A method according to claim 18, wherein the contribution from each one of the data within said boundary region is between 0% and 100%, and wherein the combination of the contribution of respective overlapping data within said boundary region adds up to a total of 100%.

20. A method according to claim 15, wherein the corresponding data is only combined within a predetermined sub-region of said boundary region.

21. A method according to claim 20, wherein said predetermined sub-region is defined by ring artefacts occurring in said enhanced attribute subvolumes.

22. A method according to claim 1, further comprising a further step of:
   (h) applying a filter adapted to minimize or remove any artefacts from said enhanced attribute volume.

23. A method according to claim 1, wherein said at least one attribute is any one of the amplitude, shape, position of a seismic waveform, or the coherence, dip/azimuth, structural orientation, semblance and volumetric curvature derivable from said 3D seismic survey data.

24. A method according to claim 1, wherein said at least one geologic feature is a fault.

25. A method according to claim 1, wherein said characteristic parameter is the intensity of each one of said plurality of voxels.

26. A computer system adapted to visually enhance at least one geologic feature in 3D seismic survey data by processing said 3D seismic survey data utilising a method characterised by features according to claim 1.

\* \* \* \* \*